3,605,810
FLOW DIVERTER VALVE
Bernard M. Moroney, Tulsa, Okla., assignor to
Metric, Inc., Tulsa, Okla.
Filed Nov. 18, 1968, Ser. No. 776,508
Int. Cl. F16k *11/07*
U.S. Cl. 137—625.43            11 Claims

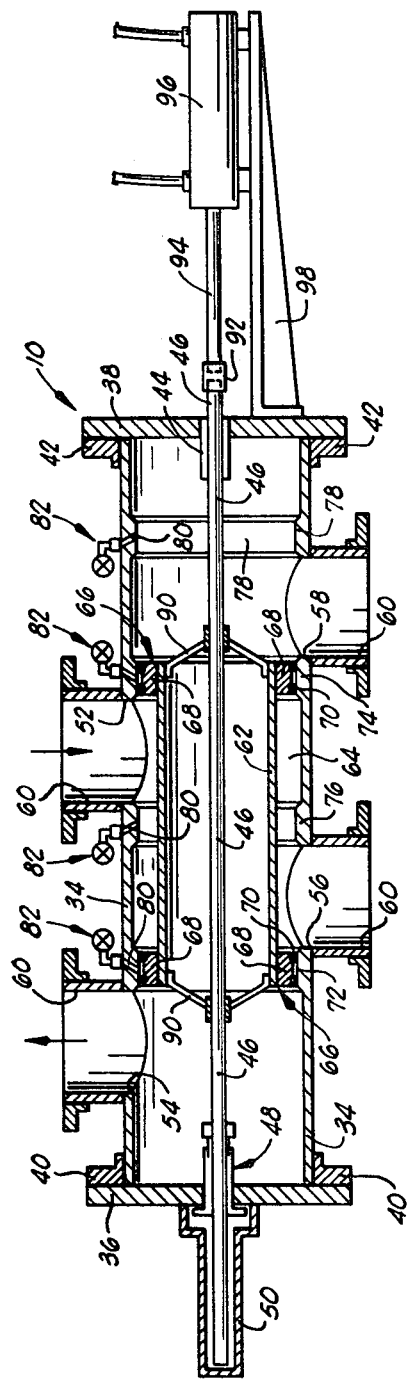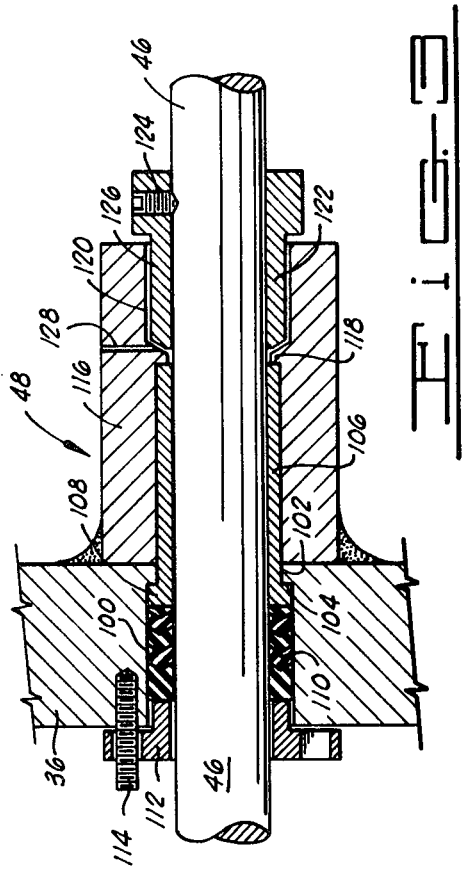

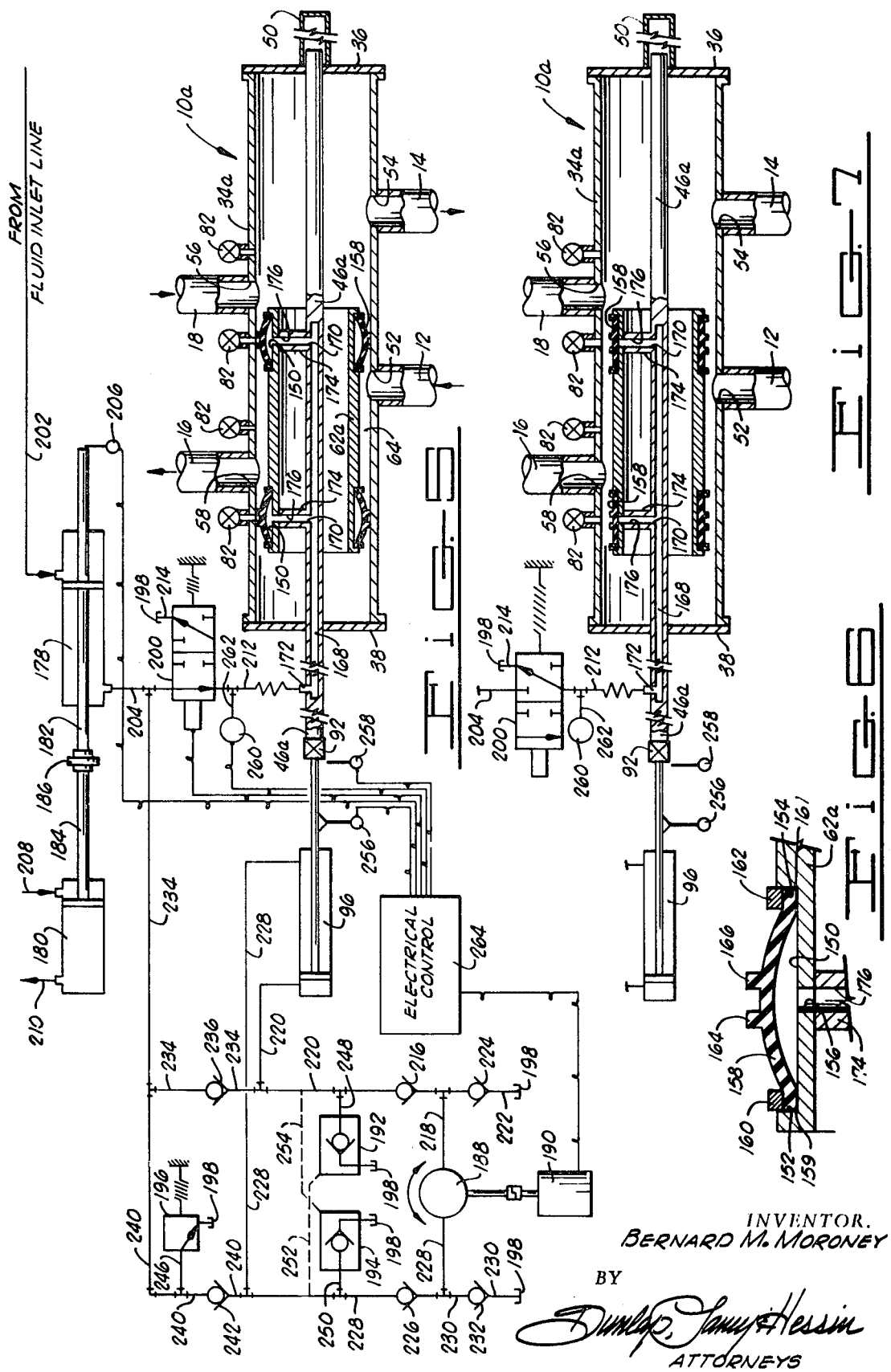

ABSTRACT OF THE DISCLOSURE

A flow diverter valve which includes an elongated, hollow external barrel concentrically surrounding a shorter hollow internal barrel and defining an annulus therewith. Annular seals are secured to opposite end portions of the internal barrel and engage the internal wall of the external barrel to prevent fluid flow past the seals between the barrels. A device is provided for reciprocating in the external barrel, the internal barrel and the seals secured thereto. A plurality of ports are provided through the external barrel in axially spaced relation therealong so that in one position of said internal barrel, some of the ports are placed in fluid communication through said annulus concurrently with the placement of the remaining of the ports in fluid communication through the interior of said hollow internal barrel, and in a second position of the internal barrel, pairing of the ports which are in fluid communication is altered.

BACKGROUND OF THE INVENTION

This invention relates generally to improvements in flow diverter valves, and more particularly, but not by way of limitation, to an improved diverter valve for use in cooperation with meter prover loops.

(1) Brief description of the prior art

A system which has been employed for calibrating and checking the accuracy of flow meters used for measuring flowing quantities of petroleum and petroleum products has included a tubular loop in which a piston is caused to move when the liquid measured by the meter is directed therethrough in series flow with the flow through the meter. Means is provided for sensing the movement of the piston past two reference points spaced along the loop, and from this deriving the volume of flow of the liquid in the loop. This accurately measured parameter is then compared with the volume of flow indicated by the meter to check the meter's accuracy and calibrate it as required.

To improve the sensitivity and accuracy of the calibrating system, flow diverter valves have been proposed for connection to the line in which the meter is located, to a discharge line and to the two legs of the loop, and which function to permit periodic reversal of the direction of fluid flow through the loop. The piston is thus caused to move back and forth across the sensing points a number of times to yield a number of volume readings which can be averaged. A valve of this type is depicted, and its operation described, in U.S. Pat. 3,295,357 to Halpine et al. As explained in this patent, it is highly desirable in valves of this type that fluid flow through the system (that is, from the meter-containing line to the discharge line) not be interrupted at any time during the meter checking and calibrating operation.

(2) Summary of the invention

The present invention is an improved flow diverter valve, which is connectable to fluid inlet and discharge lines, and concurrently, to the legs of a piston-containing meter calibrating loop. The valve is, of course, useful in other applications where four fluid conduits are to be sequentially connected in alternate pairings, but is especially useful in combination with the meter "prover" loops because its operation does not interrupt flow to the fluid discharge line at any time, and pressure balance in the valve prolongs its life, and aids in preventing surging during shifting of the valve which decreases the accuracy of the measurements obtained with the meter prover loop.

Broadly described, the present invention comprises an external barrel which concentrically surrounds, and defines an annulus with, a hollow internal barrel which is of shorter length than the external barrel. The internal barrel has an annular seal means around each of its opposite ends to prevent fluid flow past the seal means between the two barrels. Means is provided for slidingly reciprocating the internal barrel in the external barrel. In a preferred embodiment of the invention, at least four axially spaced ports extend through the external barrel and their arrangement is such that two of the four ports communicate with the annulus between the seal means when the internal barrel is in one position, and the remaining ports are at this time axially spaced on opposite sides of the internal barrel. When the internal barrel is reciprocated to a second position, pairing of the ports is changed so that one port continues to communicate with said annulus, and one of those not previously in such communication is then caused to so communicate.

An object of the present invention is to provide an improved flow diverter valve for connection to at least four pipes to continuously receive fluid from one pipe and discharge it into another while periodically shifting to alternately discharge fluid to, or receive fluid from, the remaining two pipes.

Another object of the invention is to provide a meter proving system which includes improved valving which permits continuous, automatic custody transfer of liquids without interruption during concurrent checking and calibrating of the fluid flow meter of the system.

A further object of the invention is to provide a reciprocating fluid flow diverter valve which can maintain continuous flow through the valve in a smooth, uniform manner while undergoing shifting.

Another object of the invention is to provide a flow diverter valve which includes means for indicating externally of the valve, the fluid-tight integrity of seals used in the valve.

A still further object of the invention is to provide a flow diverter valve with inflatable seal means, such that the seal means may be deflated during the time when the position of the diverter valve is being changed, thereby eliminating premature wearing or destruction of the seal means.

One further object of the invention is to provide a flow diverter valve having inflatable seal means, wherein the seal means are pressurized a controlled amount above the pressure against which they must seal.

A further object of the invention is to provide a control system for a flow diverter valve having inflatable seal means, which control system automatically shifts the position of the diverter valve and simultaneously inflates or deflates the seal means, depending on the position of the diverter valve.

Additional objects and advantages of the invention will become apparent as the following detailed description is read in conjunction with the accompanying drawings which illustrate the invention.

BRIEF DESCRIPTION OF THE DRAWINGS

FIG. 2 is a longitudinal sectional view through the flow diverter valve of the invention.

FIG. 3 is a detail view of a rod seal used in the flow diverter valve of the invention with the rod illustrated in elevation and other parts shown in section.

FIG. 5 is a partially sectional, partially diagrammatical view of a flow diverter valve constructed in accordance with the invention, including a diagrammatical view of one form of external hydraulic circuitry which may be used to control the flow diverter valve.

FIG. 6 is an enlarged partial sectional view of the seal member of the flow diverter valve shown in FIG. 5.

FIG. 7 is a sectional view of a portion of the flow diverter valve assembly shown in FIG. 5, showing the seal members in the deflated position.

DETAILED DESCRIPTION OF A PREFERRED EMBODIMENT OF THE INVENTION

Figure 1:
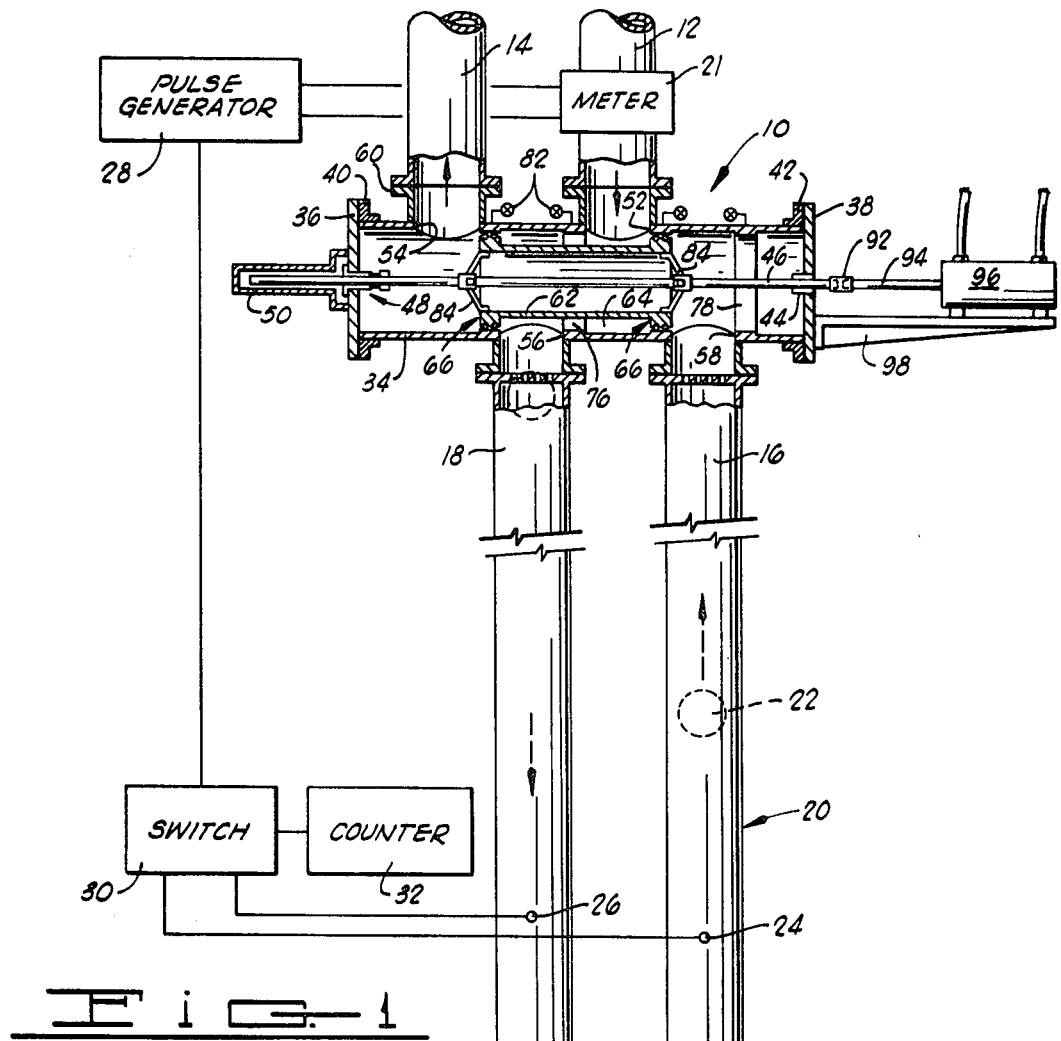
FIG. 1 is a partially elevational, partially sectional view of a flow meter calibrating apparatus incorporating the flow diverter valve of the present invention.

Referring initially to FIG. 1 of the drawings, this figure shows a flow meter calibrating system which incorporates the flow diverter valve of the present invention. The flow diverter valve is designated generally by reference numeral 10 and is shown connected to a fluid inlet line 12, a fluid discharge line 14, and the legs 16 and 18 of a U-shaped tubular loop designated generally by reference numeral 20. The fluid inlet line 12 is connected to, and directs fluid into and through, a meter 21, which the apparatus shown in FIG. 1, is to be used to calibrate. Positioned in the tubular loop 20 is a spherical piston 22 which is caused to circulate or move back and forth in the loop, and which passes two points spaced along the loop and at which are located piston detecting means 24 and 26. The piston detecting means 24 and 26 function to sense the passage of the spherical piston 22 by the points at which the detecting means are located within the loop 20.

The meter 21 is provided with a pulse generator 28 which produces an electrical pulse output directly proportional to the measured flow of fluid through the meter. The electrical pulse output is directed to an electronic switch 30 which is also connected to the piston detector means 24 and 26. The output of the electronic switch 30 is connected to a counter 32. As the apparatus is utilized, the movement of the spherical piston 22 in the tubular loop 20 first passes one or the other of the piston detector means 24 or 26 to initiate, through the switch 30, the counting of the pulse output of the pulse generator 28. When the spherical piston reaches the other of the detector means 24 and 26, the count is automatically stopped.

Since the operation of the electronic and electrical portions of the meter proving system depicted in FIG. 1 are well understood in the art and can be further understood by reference to Halpine et al. U.S. Pat. 3,295,357 and the patents referred to therein, no further discussion of the counting and proving operation will be set forth in the present application. The salient feature of the present invention is the provision of the novel flow diverter valve 10 which may be very usefully employed in combination with the other elements of structure depicted in FIG. 1.

The manner in which the flow diverter valve 10 is utilized to control the flow of petroleum products or the like through the meter proving system of FIG. 1 will be hereinafter discussed in greater detail.

Referring to FIG. 2 of the drawings, the flow diverter valve 10 of the invention is there illustrated in greater detail. The valve 10 is thus seen to include an external hollow barrel 34. The external barrel 34 has its open opposite ends closed by means of centrally apertured closure plates 36 and 38 which bear against, and are secured to, annular brace flanges 40 and 42, respectively, which are welded or otherwise suitably secured around the external barrel. A suitable bushing or bearing sleeve 44 is positioned in the central aperture in the closure plate 38 and slidingly receives a piston rod 46. At the other end of the external barrel 34, the piston rod 46 is passed through a journal assembly designated generally by reference numeral 48 and into a rod guard housing 50 which is secured to the closure plate 36.

The wall of the external barrel 34 is provided with a plurality of ports over its length which are at least four in number and which are grouped as depicted in FIG. 2. Thus, there are provided a pair of what will be termed fluid inlet and fluid outlet ports, 52 and 54, respectively, and a pair of prover loop connection ports 56 and 58. Each of the ports 52–58 communicates with the interior of a suitable flanged fitting 60 which may be used to connect the respective port to a pipe line or conduit in the manner shown in FIG. 1.

Positioned within the external barrel 34 is a hollow internal barrel 62 which is open at its opposite ends and which is of a diameter such that an annulus 64 is defined between the internal and external barrels. The internal barrel 62 has extended therearound and secured thereto at its opposite ends, a pair of annulus sealing rings designated generally by reference numeral 66. The annulus sealing rings 66 include an annular base ring 68, which is secured to the outer wall of the internal barrel 62 and a pair of peripherally located, axially spaced O-ring seals 70.

It will be noted in referring to FIG. 2 that the length of the internal hollow barrel 62 is such that it extends across or spans the ports 52 and 56 in the external barrel with the annulus sealing rings 66 located on the opposite sides of these ports from each other, so that the ports 52 and 56 may be said to communicate with each other via the annulus 64 which is defined between the internal and external barrels 62 and 34 respectively. Fluid within the annulus 64 is prevented by the annulus sealing rings 66 from escaping therefrom other than through the ports 52 and 56.

Cooperating with the annulus sealing rings 66 are a pair of built-up internal shoulders 72 and 74 which extend around the internal wall of the external barrel 34. Thus, the O-ring seals 70 are in sliding sealing engagement with the annular shoulders 72 and 74 extending around the external barrel 34. Spaced along the external barrel 34 from the annular shoulders 72 and 74 are a second pair of internal annular shoulders 76 and 78 which extend radially inwardly in the external barrel. The internal annular shoulders 76 and 78 are spaced from each other by the same distance as are the annular shoulders 72 and 74, and are positioned so that when the internal hollow barrel 62 is reciprocated within the external barrel 34 to a position in which the annulus 64 between the two barrels is opposite the ports 52 and 58, the annulus sealing rings 66 carried by the internal barrel 62 will cooperate with and sealingly engage the shoulders 76 and 78. Thus, when the internal barrel 62 is moved toward the closure plate 38 by a predetermined distance, the annulus sealing rings 66 carried at each end of the internal barrel 62 are brought into sealing contact with the radially inwardly extending annular shoulders 76 and 78.

It will be observed that each of the annular shoulders 72, 74, 76 and 78 is provided with a small orifice 80 which extends therethrough to place the inside of the external barrel 34 in communication with the exterior thereof. Each orifice 80 communicates the interior of the external barrel 34 with a seal leakage checking assembly designated generally by reference numeral 82. The seal leakage checking assembly 82, shown more clearly in FIG. 4, includes a nipple connection 84, which is secured to the outer wall of external barrel 34 such that the orifice 80 is enclosed therein. A conduit 86 is connected to nipple 84 and includes a flow indicating valve 88 on the opposite end thereof.

For the purpose of reciprocating the internal barrel 62 within the external barrel 34, the internal barrel 62 is secured to the piston rod 46 by means of a pair of spider assemblies 90 located at each end thereof. The particular construction of the spider assemblies 90 is not critical so long as it permits free passage of fluid through the interior of the internal barrel 62 around the piston rod 46, and securely connects the internal barrel 62 to the piston rod 46 for reciprocating movement in the external barrel 34. The piston rod 46 is secured through a suitable coupling 92 to a rod 94 driven in reciprocation by a suitable power cylinder 96. The power cylinder 96 is mounted in proper alignment with the central aperture through the closure plate 38 by means of a mounting plate 98 secured to the closure plate 38 by any suitable means.

The details of construction of the rod seal assembly 48 are best illustrated in FIG. 3. As depicted in this figure, the piston rod 46 is extended through an enlarged bore 100 formed in the closure plate 36 of the external barrel 34. The closure plate 36 is also provided with a counterbore 102 which, with the bore 100, forms a shoulder 104 against which abuts a cooperating shoulder of a flanged bushing 106. The flanged bushing 106 carries an annular flange 108 adjacent one of its ends, and this flange 108 abuts a chevron packing 110 positioned in the bore 100. The packing 110 is maintained under compression by a gland seal insert 112 which is secured to the closure plate 36 by a plurality of threaded fasteners 114. The elongated shank portion of the bushing 106 extends into a rod sleeve 116 which is welded to the inside face of the closure plate 36 in coaxial alignment with the bore 100 and counterbore 102. The rod sleeve 116 has an internal shoulder 118 therein against which the end of the bushing 106 abuts, and is also provided with a counterbore 120 which accommodates a stroke dampener and stop element 122 which is secured to the rod 46 by a suitable set screw 124 so that the stroke dampener and stop element 122 moves with the rod. The stroke dampener and stop 122 has a shank portion 126 which is of smaller diameter than the counterbore 120 in the rod sleeve 116. Thus, during reciprocation of the piston rod 46, a dashpot effect is obtained as the shank portion 126 of the stroke dampener and stop 122 enters the counterbore 120 of the rod sleeve 116. A lubricant orifice 128 is extended through the rod sleeve 116 adjacent the shoulder 118 for the purpose of supplying lubricant to the rod 46, and also acts as a fluid vent during the occurrence of the decelerating dashpot effect.

OPERATION OF THE EMBODIMENT OF FIG. 2

Generally speaking, the function of the flow diverter valve 10 is to alternately place the port 52 of the external barrel 34 in communication with either the port 56 or 58 thereof, and simultaneously provide a path for the fluid to discharge through port 54 of external barrel 34.

For the purpose of clarity, the operation of diverter valve 10 will be described with respect to the meter proving system, as shown in FIG. 1. It is to be understood, however, that the use of the diverter valve 10 is not limited to this type of application, but rather may be successfully employed in any application in which it is desired to alternate the flow path of fluid between a plurality of fluid inlets and discharges.

When the flow diverter valve 10 is in the position shown in FIGS. 1 and 2, the fluid flow will be directed through the meter 21 and the fluid inlet line 12, and into the external barrel 34 through the port 52 thereof. The fluid is then directed around the annulus 64 between the external barrel 34 and the internal barrel 62 and into leg 18 of loop 20 through port 56 of external barrel 34. The fluid will then flow around the prover loop 20 and out leg 16 thereof into the external barrel 34 through port 58 thereof. The fluid will then flow through the hollow portion of internal barrel 62 and into the discharge line 14 through port 54 of external barrel 34.

The flowing fluid is retained within the annulus 64 by means of annulus seal rings 66, the O-ring seals 70 thereof forming a fluid tight seal with the inner periphery of external barrel 34. In many systems, such as the one shown in FIG. 1, it is important to detect and measure the amount of fluid leakage which occurs across the annulus seal rings 66. This measurement cannot only be used to correct various other readings taken within the system, but also can be used to indicate when a particular seal member should be replaced.

Figure 4:
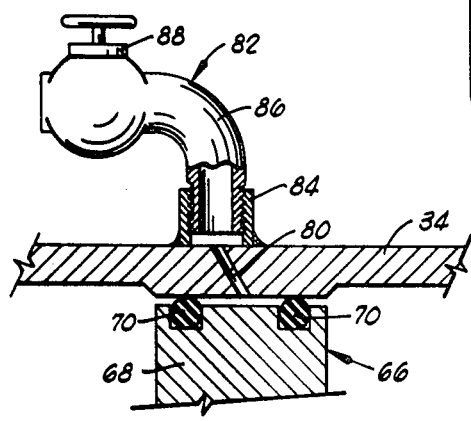
FIG. 4 is a detail view, partially in section and partially in elevation, illustrating a seal leakage indicator assembly used in the valve of the invention.

The seal leakage checking system 82, shown more clearly in FIG. 4, serves this function. When the flow indicating valve 88 is opened, the chamber existing between the O-rings 70 of seal ring 66 will be exposed to a reduced pressure via orifice 80. Thus, any leakage across the O-rings 70 will pass up through the orifice 80, and through the flow indicator valve 88. The particular flow indicator valve used in this system may be of any type and accuracy demanded by the particular application, but should be capable of indicating relatively small flows with a reasonable accuracy. From the foregoing it is apparent that the O-rings 70 of seal ring 66 must be separated a sufficient distance, so that the port 80 of external barrel 34 will be completely disposed therebetween when the diverter valve is in seated position.

When it is desired to change the direction of flow through the prover loop 20, a pressure will be applied to the appropriate end (depending on the direction in which the piston rod 46 is to be moved) of hydraulic cylinder 96. As pressure is applied to one end of the hydraulic cylinder 96, the piston rod 46 will move in a general direction from closure plate 36 to closure plate 38.

The internal barrel 62, which is attached to rod 46 by spider 90, will move the rod 46. The internal barrel 62 will move in this direction until the seal rings 66 are in alignment with the annular shoulders 76 and 78 in external barrel 34 and in sealing contact therewith. In this position it is obvious that the ports 52 and 58 are in communication via the annulus 64 between the internal barrel 62 and the external barrel 34.

When the internal barrel 62 is in this position, the fluid flow will be directed through the meter 21 and through the inlet line 12 into the external barrel 34 through port 52 thereof. The flow is then directed around the annulus 64 into leg 16 of prover loop 20. The flow will, therefore, go around the prover loop 20 in a direction opposite from that previously described and be discharged from leg 18 of prover loop 20 into the external barrel 34. The fluid will then flow from the external barrel 34 out the port 54 thereof, and into the discharge line 14.

It is apparent from the foregoing discussion that the diverter valve 10 permits the meter 21 to be checked and calibrated without interrupting the transfer of fluid from the inlet line 12 to the discharge line 14. Since the internal barrel 62 is shifted from one position to another by means of a hydraulically controlled cylinder, and further because of the dampening effect of the piston rod 46, it may be appreciated that the transfer or switching operation may be accomplished in a smooth, continuous and uniform manner, thereby eliminating any abrupt changes which could foul a particular calibration check.

EMBODIMENT OF FIG. 5

A modified diverter valve 10a is shown diagrammatically in FIG. 5 and is constructed in accordance with the invention. The modified diverter valve 10a basically includes a modified external barrel 34a, a modified internal barrel 62a and a modified piston rod 46a. The external barrel 34a is constructed exactly like the external barrel 34 shown in FIG. 2, except that no annular shoulders are provided around the inner wall of the external barrel 34a similar to the annular shoulders 72, 74, 76, and 78 of external barrel 34. The reason for the omission of the annular shoulders in this embodiment of the invention will become more apparent hereinafter.

The internal barrel 62a is constructed similarly to the internal barrel 62 of diverter valve 10, shown in FIG. 2, except as hereinafter described. As shown in FIG. 5, a pair of annular grooves 150 are formed around the outer wall of internal barrel 62a forming opposite walls 152 and 154 therein. One of these grooves 150 is illustrated in detail in FIG. 6. As there shown, at least one opening 156, extending through the wall of inner barrel 62a, is provided in the groove 150 thereof. The purpose of the opening 156 will be more fully described hereinafter.

A flexible resilient annular seal member 158, having opposite ends 159 and 161, is disposed in each groove 150 of the internal barrel 62a. In a preferred form, and as more clearly shown in FIG. 6, the ends 159 and 161 of seal member 158 abut the walls 152 and 154, respectively, of the groove 150. A pair of metal retaining rings 160 and 162 are disposed around a portion of the seal member 158, at opposite end thereof. The retaining rings 160 and 162 abut the walls 152 and 154, respectively, and are provided to retain the seal member 158 in position during the operation of the diverter valve 10a, to be described more fully hereinafter.

Two annular, substantially parallel, axially spaced beads 164 and 166 are formed around the outer periphery of seal member 158. The annular beads 164 and 166 are provided to periodically sealingly engage the inner wall of external barrel 34a, in a manner to be more fully described hereinafter.

The modified piston rod 46a is provided with a hollow chamber 168 formed therein and extending a distance therethrough. A plurality of openings 170 are provided in the piston rod 46a, said openings 170 communicating with the hollow chamber 168 thereof. An additional opening 172, also communicating with chamber 168, is provided in a portion of the piston rod 46a, which will remain outside the external barrel 34a during the operation of the diverter valve 10a, as will be more fully described hereinafter.

The piston rod 46a is secured to the internal barrel 62a by a plurality of connectors 174 extending therebetween, each connector 174 is provided with a port 176 extending therethrough. The connectors 174 are positioned such that each port 176 thereof is aligned with each respective opening 170 in piston rod 46a and with each respective opening 156 of groove 150, for reasons which will become apparent hereinafter.

One form of a control system which may be employed using the diverter valve 10a is shown diagrammatically in FIG. 5. The control system basically comprises; a pair of double acting hydraulic cylinders 178 and 180, having their respective shafts 182 and 184 interconnected through a coupling 186; a fixed displacement pump 188, driven by a reversible motor 190; a pair of pilot operated check valves 192 and 194; a relief valve 196; a sump, or fluid reservoir 198; and a solenoid valve 200, which is shown in FIG. 5, in the energized position.

One end of the hydraulic cylinder 178 is connected to the fluid inlet pipeline 12, by pipeline 202 and the opposite end thereof is connected to the solenoid valve 200 by pipeline 204. A limit switch 206 is provided on one end of the shaft 182 of hydraulic cylinder 178 and is provided to give an electrical output signal on certain movement of the shaft 182, for reason which will become apparent hereinafter.

The hydraulic cylinder 180 is provided with an air inlet pipeline 208 connected to one end thereof, and an air outlet pipeline 210 connected to the opposite end thereof. The air inlet pipeline 208 is connected to a regulated air supply (not shown).

The solenoid valve 200 is provided with three ports therein. One of the ports is connected to pipeline 204 as previously described, another of the ports is connected to the opening 172 of piston rod 46a by a partially flexible conduit 212, and the one remaining port thereof is connected to sump 198 by pipeline 214. In the energized position of solenoid valve 200, as shown in FIG. 5, a path is provided therethrough connecting pipeline 204 and conduit 212 and, thereby connecting one end of hydraulic cylinder 178 to the opening 172 of piston rod 46a. In the de-energized position of solenoid valve 200, a path is provided therethrough connecting conduit 212 and pipeline 214 and, thereby connecting the opening 172 of piston rod 46a to the sump 198.

One output from the pump 188 is connected to a check valve 216 by a pipeline 218, and the check valve 216 is connected to one end of hydraulic cylinder 96 by a pipeline 220. A pipeline 222, having a check valve 224 disposed therein, is connected by one end thereof to pipeline 218 between pump 188 and check valve 216, and the opposite end thereof is connected to sump 198.

The alternate output from pump 188 is connected to a check valve 226 by a pipeline 228, and the check valve 226 is connected to the opposite end of hydraulic cylinder 96 by pipeline 228. A pipeline 230, having a check valve 232 disposed therein, is connected by one end thereof to pipeline 228 between pump 188 and check valve 226, and the opposite end thereof is connected to sump 198.

A pipeline 234 is connected by one end thereof to pipeline 220, between hydraulic cylinder 96 and check valve 216, and the opposite end thereof is connected through a check valve 236 to pipeline 204 at a point between hydraulic cylinder 178 and solenoid valve 200. One end of a pipeline 240 is connected to pipeline 228, between hydraulic cylinder 96 and a check valve 226, and the opposite end thereof is connected through a check valve 242 to pipeline 234 at a point betwen check valve 236 and the connection of pipeline 236 to pipeline 204. The relief valve 196 is connected to pipeline 240 by a pipeline 246.

The pilot operated check valve 192 is connected to pipeline 220 by a pipeline 248, the connection of pipelines 220 and 248 being between the check valve 216 and the connection of pipelines 220 and 234. The pilot operated check valve 194 is connected to pipeline 228 by a pipeline 250, the connection of pipelines 228 and 250 being between the check valve 226 and the connection of pipelines 228 and 240.

A pilot pipeline 252 is connected to the pilot operator of pilot operated check valve 192 and the opposite end thereof is connected to the pipeline 228 at a point between the connection of pipelines 228 and 250 and the connection of pipelines 228 and 240. A second pilot pipeline 254 is connected to the pilot operator of pilot operated check valve 194 and the opposite end thereof is connected to pipeline 220 at a point between the connection of pipelines 248 and 220 and the connection of pipelines 234 and 220.

Two limit switches 256 and 258 are disposed along the piston rod 46a and are provided to give an electrical output signal upon certain movements of the piston rod 46a, which will be described in more detail hereinafter. A pressure switch 260 is connected to conduit 212 by a connecting pipeline 262, and is adapted to give an electrical output signal when the fluid pressure in conduit 212 reaches a predetermined level.

An electrical control panel designated by the general reference character 264 is provided to receive the output signals of the limit switches 206, 256 and 258 and pressure switch 260 and to thereby control the operation of solenoid valve 200 and pump motor 190. The particular functions of the electrical control panel will be described more fully hereinafter; however the particular components therein and the particular combination of these components to perform the desired control functions are well known in the art and need not be shown in any greater detail.

OPERATION OF EMBODIMENT OF FIG. 5

In general, the function performed by flow diverter valve 10a, when used in a meter proving system similar to that shown in FIG. 1, will be the same as flow diverter valve 10 shown in FIG. 1, in that, diverter valve 10a will permit the flow meter 21 in the system to be checked and calibrated without interrupting the automatic custody transfer of liquids through the fluid input and discharge lines 12 and 14 respectively, shown in FIG. 1, and will reverse the direction of flow through the legs 16 and 18 of prover loop 20. The specific operation of flow diverter valve 10a, is however, slightly different than the specific operation of flow diverter valve 10 (FIG. 1), and will be described hereinafter.

As shown in FIG. 5, the internal barrel 62a is positioned in one operating position of the flow diverter valve 10a, and the seal members 158 are inflated or pressurized (in a manner described in greater detail hereinafter) to provide sealing engagement with the inner wall of the external barrel 34a. The length of internal barrel 62a and the location of seal members 158 on the internal barrel 62a are provided such that, in this position, the respective seal members 158 sealingly engage the inner periphery of the external barrel 34a on opposite sides of ports 52 and 58 from each other. Since the fluid inlet line 12 is connected to port 52 and the leg 16 is connected to the port 58, it may be appreciated that fluid inlet line 12 communicates with the leg 16 via the annulus 64 which is formed between the internal and external barrels 62a and 34a respectively.

Thus, in the position of the internal barrel 62a shown in FIG. 5, the fluid will flow through the fluid inlet pipeline 12, around the annulus 64, through the leg 16 and around the prover loop 20 entering the external barrel 62a via leg 18, and will then be discharged through the fluid discharge line 14. The fluid within the annulus 64 is prevented from escaping therefrom, other than through the inlet pipeline 12 and the leg 16, by the seal members 158, which are in sealing engagement with the inner well wall of external barrel 34a.

When it is desired to reverse the flow of fluid through the proved loop 20, thereby returning the spherical piston 22 to its home or starting position, the seal members 158 are deflated or depressurized (shown in FIG. 6) the hydraulic cylinder is actuated to move the piston rod 46a, thereby moving the internal barrel 62a to a position wherein the annulus 64 formed between the internal barrel 62a and the external barrel 34a defines a path between the ports 52 and 56, respectively, of external barrel 34a, and the seal members 158 are than inflated or pressurized to sealingly engage the inner periphery of external barrel 34a (the details of the control circuit necessary to accomplish the above described shifting of the internal barrel 62a will be described hereinafter). In this position of the internal barrel 62a, the fluid will flow through the inlet line 12, around the annulus 64 through the leg 18 and around the prover loop 20, entering the external barrel 62a via leg 16, through the hollow portion of internal barrel 62a, and will then be discharged through discharge line 14. The fluid within the annulus 64 is prevented from escaping therefrom, other than through the inlet line 12 and the leg 18 by the seal members 158.

In the position of the diverter valve 10a shown in FIG. 5, the solenoid valve 200 has been energized through the electrical control 264, thereby connecting pipeline 204 and conduit 212 and thus connecting the hydraulic cylinder 178 to the opening 172 of piston rod 46a. Fluid pressure, provided by the hydraulic cylinder 178, occupies the chamber 168 of piston rod 46a, and is provided to pressurize the seal members 158 through the ports 176 of connectors 174. The hydraulic cylinder 96 through pipeline 228 is pressurized, thereby holding the piston rod 46a in position. The motor 190 has been disconnected through the electrical control 264 and therefore the pump 188 is in the nonoperate or off condition.

When the position of the internal barrel 62a is to be shifted, the electrical control is actuated. The solenoid valve 200 is deenergized, thereby connecting conduit 212 and pipeline 214, as more clearly shown in FIG. 7. It is apparent that in this position the fluid pressure in the chamber 168 of piston rod 46a will drain to the sump 214, thereby deflating, or depressurizing the seal member 158. The seal members 158 are shown in FIG. 7 in the depressurized or relaxed position, and it is obvious that in this relaxed state, the internal barrel 62a may be shifted without damage, or excessive wear occurring to the seal members 158, since the seal members 158 will not be in contact with the inner wall or external barrel 34a.

The pressure switch 260 will sense the pressure in conduit 212 and, when the pressure in conduit 212 drops to a predetermined level indicating the seal members 158 are in the depressurized position, an electrical signal will be sent to the electrical control 264. The electrical control, upon receiving the signal from pressure switch 260, will start the motor 190. The motor 190 will rotate the pump 188 in a direction such that fluid will be pumped therefrom, through pipelines 218 and 220 to the end of hydraulic cylinder 96 which is connected to pipeline 220. The fluid will also be pumped through pilot line 254 to the pilot operated check valve 194, thereby opening the check valve 194 and allowing the fluid pressure in the end of the hydraulic cylinder 96, which is connected to pipeline 228, to be relieved or dumped through pipelines 228 and 250 and to the sump 194. It is apparent that the piston rod 46a will then be moved in an inward direction, thereby moving or shifting the internal barrel 62a.

When the piston rod 46a reaches the end of its travel, the pump 188 will continue to supply fluid through pipelines 234 and 204 to the hydraulic cylinder 178. The opposite end of the hydraulic cylinder 178 contains a pressure equal to the pressure in the fluid inlet line 12 supplied thereto by pipeline 202. It may be observed in FIG. 5, that a control pressure is supplied to hydraulic cylinder 180 through pipeline 208, which would tend to move the shaft 184 of hydraulic cylinder 180 in the same direction that the pressure supplied through pipeline 202 tends to move the shaft 182 of hydraulic cylinder 178. Since the two shafts 182 and 184 are interconnected by coupling 186, the two pressures are additive. In other words, the fluid pumped by pump 188 must build to a pressure, which slightly exceeds the sum of the pressures in the input pipeline 12 and the control pressure supplied to hydraulic cylinder 180, before the shafts 182 and 184 will move in the outward direction. The reason the hydraulic cylinders 178 and 180 are so provided will become apparent hereinafter.

The shaft 182 of hydraulic cylinder 178 will move in the outward direction until the end thereof contacts and actuates the limit switch 206, thereby indicating sufficient pressure and volume is built up in the hydraulic cylinder 178. When the limits switch 206 is actuated, an electrical response is sent to the electrical control 264.

Upon the response of limit switch 206 the electrical control 264 will electrically disconnect the motor 190, thereby stopping the pump 188, and will energize the solenoid valve 200. When the solenoid valve 200 is energized, the pipeline 204 and the conduit 212 will be connected therethrough, thereby allowing the fluid pressure from hydraulic cylinder 178 to enter the chamber 168 of piston rod 46a, pressurizing the seal members 158.

From the foregoing it may be appreciated that the seal members 158 are pressurized by a pressure which will exceed the pressure of the fluid in the external barrel 34a and in the annulus 64 by an amount equal to the control pressure supplied to the hydraulic cylinder 180. The integrity of the fluid tight seal between the seal members 158 and the inner periphery of external barrel 34a is thus assured and may thereby be controlled.

The limit switches 256 and 258 cooperate with the piston rod 46a to indicate the position of the internal barrel 62a. As shown in FIG. 5, the limit switch 256 has been actuated, and an electrical response therefrom is sent to the electrical control 264 and indicates that the internal barrel 62a is in the position shown in FIG. 5. The limit switches 256 and 258, in a preferred form, are also connected to a fail-safe feature in the electrical control 264, such that when neither of the limit switches 256 or 258 indicate a response, or in other words when the internal barrel 62a is not in an operating position, the solenoid valve 200 cannot be actuated to pressurize the seal members 158. The relief valve 196 is provided as a safety feature to prevent the fluid pressure to the hydraulic cylinder 178 from exceeding a predetermined point.

When it is desired to move the internal barrel 62a from the position described in the foregoing, back to the position shown in FIG. 5, the electrical control is again actuated. The seal members 158 are depressurized by de-energizing solenoid valve 200 and the motor 190 is started in a manner similar to that already described.

The rotation of the motor 190 will be reversed from the direction previously described and the pump 188 will pump fluid from the sump 198 through lines 218, discharging the fluid through line 228 to the end of hydraulic cylinder 96 connected thereto. The fluid will also be pumped through pilot line 252 to pilot operated check valve 192, thereby opening the check valve 192 and dumping the pressure on the opposite end of hydraulic cylinder 96 through pipelines 220 and 248 and through pilot operated check valve 192 to sump 198.

It may be appreciated that the result will be that the piston rod will move in a direction opposite to that previously described. The remaining operations will be similar to those previously described, so that when the internal barrel 62a is in the operate position the seal members 158 will be pressurized.

The seal leakage checking system 82 will function exactly the same as previously described with respect to flow diverter valve 10, in FIG. 2. However, in the form of the invention shown in FIG. 5 using seal member 158, the fluid checking system 82 will measure and indicate the flow of fluid across the seal beads 164 and 166. It is, therefore, apparent that the distance between the beads 164 and 166 must be sufficient so that the port 80 of external barrel 24a will be completely disposed therebetween when the valve is in the operating or seating position.

It is apparent from the foregoing that the flow diverter valve 10a will permit the checking and calibration of the meter 21 without interrupting the flow of fluid and the continuous and uniform switching of the internal barrel 62a, as previously described with respect to flow diverter valve 10, shown in FIG. 2. The flow diverter valve 10a also provides a valve wherein the sealing pressure effected by the seal means may be controlled to always be a preset amount above the pressure against which the seal means must work.

It should also be noted that the portion of the control system shown in FIG. 5, excluding the elements provided therein to pressurize and depressurize the seal means, could be effectively used to control the flow diverter valve 10, shown in FIG. 1. The electrical components shown in FIG. 5 could be replaced with pneumatic components, if the diverter valve 10a were to be used in an application where electrical power was not available.

Changes may be made in the construction and arrangement of the parts or elements of the various embodiments as disclosed herein without departing from the spirit and scope of the invention as defined in the following claims.

What is claimed is:
1. A flow diverter valve comprising:
a hollow, external barrel having closed opposite ends;
a hollow, internal barrel mounted concentrically and movably within said external barrel and defining an annulus therewith;
an annular elastomeric seal means secured on each end portion of the internal barrel, each of said seal means having a central portion thereof free to expand, thereby forming a chamber between the central portion of said elastomeric seal means and the outer wall of said internal barrel, said elastomeric seal means further including a pair of annular, spaced beads forming an outer peripheral portion of said elastomeric seal means, said annular beads being sized to sealingly engage the inner wall of the external barrel when a pressure exists in said chamber expanding said elastomeric seal means to thereby prevent, by said sealing engagement, fluid flow from the annulus past said seal means;
means for reciprocating the internal barrel axially within the external barrel;
a plurality of fluid ports spaced axially along said external barrel and communicating with the interior thereof, said fluid ports being spaced from each other so that in a first position of said internal barrel within said external barrel, some of said ports communicate with each other through said annulus, and the remaining ports communicate through said external barrel, and when the internal barrel is reciprocated to a second position within said external barrel, some of said ports communicate with each other through said annulus, and the remaining ports communicate through the external barrel and through the hollow interior of the internal barrel; and
means for detecting leakage of fluid from said annulus past said elastomeric seal means, said means for detecting leakage comprising:
a plurality of orifices in the external barrel, disposed to intersect the inner wall of the external barrel between the annular beads of the elastomeric seal means when the inner barrel is in one of said first or second positions; and
a flow indicating valve means connected to the external barrel and communicating with said orifices to indicate the flow therethrough when said flow indicating valve means is opened.

2. A flow diverter valve comprising:
a hollow external barrel having closed opposite ends;
a hollow internal barrel mounted concentrically and movably within said external barrel and defining an annulus therewith,
an annular elastomeric seal means secured on each end portion of the internal barrel, each of said seal means having a central portion thereof free to expand, thereby forming a chamber between the central portion of said elastomeric seal means and the outer wall of said internal barrel, said elastomeric seal means being sized such that, when a pressure exists in said chamber, a portion of said elastomeric seal means expands and sealingly contacts the inner wall of the external barrel to prevent fluid flow from the annulus past said seal means;
a piston rod, having a hollow chamber formed in a portion thereof, and a plurality of openings formed therein communicating with the hollow chamber, one of said openings being disposed on a portion of the piston rod remaining outside the external barrel as the internal barrel is reciprocated;
a plurality of connectors, each having a port extending therethrough secured between, and interconnecting, the piston rod and the inner wall of the internal barrel, with the port through each connector placing one of said openings in communication with said chamber formed between the annular elastomeric seal means and the internal barrel;

driving means secured to the piston rod for driving the rod and the internal barrel connected thereto in reciprocation;

means for supplying a fluid under pressure to the chamber in the piston rod and thereby to the annular elastomeric seal means, said means for supplying a fluid under pressure including automatic pressure adjusting means for automatically adjusting the pressure of said fluid to a value above the pressure existing in said external barrel against which the annular seal means are to seal; and a plurality of fluid ports spaced axially along said external barrel and communicating with the interior thereof, said ports being spaced from each other so that in one position of said internal barrel within said external barrel, some of said ports communicate with each other through said annulus, and the remaining ports communicate through said external barrel, and when the internal barrel is reciprocated to a second position within said external barrel, some of said ports communicate with each other through said annulus, and the remaining ports communicate through the external barrel and through the hollow interior of the internal barrel.

3. The flow diverter valve of claim 2 wherein the means for supplying pressure to said annular elastomeric seal means further comprises:

a first hydraulic cylinder means having a shaft extending therethrough;

a second hydraulic cylinder means having a shaft extending therethrough, said shaft of the second hydraulic cylinder means being connected to the shaft of the first hydraulic cylinder means;

a controlled pressure supply source connected to the second hydraulic cylinder means for driving the shaft thereof;

means for connecting the first hydraulic cylinder means to one of said fluid ports in said external barrel for driving the shafts of said first and second hydraulic cylinder means in the same direction as they are driven by said controlled pressure source;

a pump means supplying pressure to said first hydraulic cylinder means for driving the shaft thereof in an opposite direction from the direction which said shaft is being driven by said controlled pressure supply source; and control valve means for releasing to the annular elastomeric seal means, the pressure supplied to said first hydraulic cylinder means by the pump means, thereby pressurizing said annular elastomeric seal means.

4. The flow diverter valve of claim 3 defined further to include limit switch means responsive to the movement of the shaft of the first hydraulic cylinder means for disconnecting said pump means from said first hydraulic cylinder means when the movement of the shaft of the first hydraulic cylinder means indicates a sufficient pressure and volume of fluid has accumulated in said first hydraulic cylinder means to pressurize the annular elastomeric seal means.

5. The flow diverter valve of claim 3 defined further to include a pair of spaced limit switches each independently responsive to the movement of said piston rod to prevent the annular elastomeric seal means from being pressurized until said piston rod has been reciprocated to a position corresponding to the first or second position of said internal barrel within said external barrel.

6. A flow diverter valve comprising:

a hollow external barrel having closed opposite ends;

a hollow internal barrel mounted concentrically and movably within said external barrel and defining an annulus therewith;

an annular elastomeric seal means secured on each end portion of the internal barrel, each of said seal means having a central portion thereof free to expand, thereby forming a chamber between the central portion of said elastomeric seal means and the outer wall of the internal barrel, said elastomeric seal means being sized such that when a pressure exists in said chamber, a portion of said elastomeric seal means expands and sealingly contacts the inner wall of the external barrel to prevent fluid flow from the annulus past said seal means;

means for reciprocating the internal barrel axially within the external barrel;

a plurality of fluid ports spaced axially along said external barrel and communicating with the interior thereof, said ports being spaced from each other so that in one position of said internal barrel within said external barrel, some of said ports communicate with each other through said annulus, and the remaining ports communicate through said external barrel, and when the internal barrel is reciprocated to a second position within said external barrel, some of said ports communicate with each other through said annulus, and the remaining ports communicate through the external barrel and through the hollow interior of the internal barrel; and means for automatically inflating said annular seal means when said internal barrel occupies said one position or said second position in said external barrel whereby each of said annular seal means is inflated and sealingly contacts the inner wall of the external barrel, and for automatically deflating said annular seal means when said internal barrel is disposed between said one position and said second position whereby said annular seal means are out of contact with the inner wall of said external barrel.

7. A flow diverter valve comprising:

a hollow external barrel having closed opposite ends;

a hollow internal barrel mounted concentrically and movably within said external barrel and defining an annulus therewith;

an annular elastomeric seal means secured on each end portion of the internal barrel, each of said seal means having a central portion thereof free to expand, thereby forming a chamber between the central portion of said elastomeric seal means and the outer wall of said internal barrel, said elastomeric seal means being sized such that when a pressure exists in said chamber, a portion of said elastomeric seal means expands and sealingly contacts the inner wall of the external barrel to prevent fluid flow from the annulus past said seal means;

means for reciprocating the internal barrel axially wtihin the external barrel;

a plurality of fluid ports spaced axially along said external barrel and communicating with the interior thereof, said ports being spaced from each other so that in one position of said internal barrel within said external barrel, some of said ports communicate with each other through said annulus, and the remaining ports communicate through said external barrel, and when the internal barrel is reciprocated to a second position within said external barrel, some of said ports communicate with each other through said annulus, and the remaining ports communicate through the external barrel and through the hollow interior of the internal barrel; and means for automatically supplying a fluid under pressure to the chamber between the central portion of said elastomeric seal means and the outer wall of said external barrel, and for automatically adjusting the pressure of said fluid to a value above the pressure existing in said external barrel against which the annular seal means are to seal.

8. A flow diverter valve comprising:
a hollow external barrel having closed opposite ends;
a hollow internal barrel mounted concentrically and movably within said external barrel and defining an annulus therewith;
a plurality of fluid ports spaced axially along said external barrel and communicating with the interior thereof, said ports being spaced from each other so that, in a first position of said internal barrel within said external barrel, some of said ports communicate with each other through said annulus, and the remaining ports communicate through said external barrel, and when the internal barrel is reciprocated to a second position within said external barrel, some of said ports communiate with each other through said annulus, and the remaining ports communicate through the external barrel and through the hollow interior of said internal barrel;
annular elastomeric sealing means secured around the outer wall of the internal barrel at opposite ends thereof, and engaging the internal wall of the external barrel to prevent fluid flow from the annulus past said sealing means, each of said annular elastomeric sealing means including a pair of annular, axially spaced elastomeric members sized to sealingly engage the inner wall of said external barrel when said internal barrel is in said first and second positions relative to said external barrel;
means for detecting leakage of fluid from said annulus past said elastomeric seal means comprising flow indicating valve means connected to the external barrel and communicating with the spaces between said axially spaced elastomeric members when said internal barrel is in either of said first or second positions relative to said external barrel; and
means for reciprocating the internal barrel axially within the external barrel.

9. A flow diverter valve comprising:
a hollow external barrel having closed opposite ends;
a hollow internal barrel movable mounted within said external barrel and defining an annulus therewith;
sealing means secured around the outer wall of the internal barrel and engaging the inner wall of the external barrel to prevent fluid flow from the annulus past said sealing means;
a piston rod secured to said internal barrel and extending through one of the closed ends of the external barrel;
a rod sleeve secured to the other closed end of said external barrel and projecting inwardly in said external barrel around said piston rod, said rod sleeve having a counterbore therein spaced along the piston rod from said second closed end of the external barrel and concentrically surrounding the piston rod;
means secured around said piston rod and dimensioned for entry with clearance into said counterbore during movement of said hollow internal barrel within said external barrel and concurrent movement of said piston rod to provide a decelerating effect upon reciprocation of said piston rod; and
a plurality of fluid ports spaced axially along said external barrel and communicating with the interior thereof, said ports being spaced from each other so that, in one position of said internal barrel within said external barrel, some of said ports communicate with each other through said annulus, and the remaining ports communicate through said external barrel, and when the internal barrel is reciprocated to a second position within said external barrel, some of said ports communicate with each other through said annulus, and the remaining ports communicate through the external barrel and through the hollow interior of said internal barrel.

10. A flow diverter valve comprising:
a hollow external barrel having closed opposite ends;
a hollow internal barrel mounted concentrically and movably within said external barrel and defining an annulus therewith;
sealing means secured around the outer wall of the internal barrel and engaging the internal wall of the external barrel to prevent fluid flow from the annulus past said sealing means;
a piston rod secured to said internal barrel and extending through a first closed end of the external barrel; and
driving means outside the external barrel and secured to the piston rod for driving the rod in the internal barrel in reciprocation;
a journal assembly in the second closed end of said external barrel and surrounding and engaging an end portion of said piston rod extending through said second closed end of said external barrel, said journal assembly comprising:
   a bushing around the piston rod;
   a gland seal insert around the piston rod and spaced from the bushing;
   a packing around the piston rod and compressed between the bushing and gland seal insert;
   a rod sleeve around the bushing and piston rod and secured to said second closed end of the external barrel, said rod sleeve having a counterbore therein spaced along the piston rod from said bushing and concentrically surrounding the piston rod; and
   a stroke dampener and stop element secured around said piston rod and dimensioned for entry into said counterbore; and
a plurality of fluid ports spaced axially along said external barrel and communicating with the interior thereof, said ports being spaced from each other so that, in one position of said internal barrel within said external barrel, some of said ports communicate with each other through said annulus, and the remaining ports communicate through said external barrel, and when the internal barrel is reciprocated to a second position within said external barrel, some of said ports communicate with each other through said annulus, and the remaining ports communicate through the external barrel and through the hollow interior of the internal barrel.

11. A flow diverter valve comprising:
a hollow external barrel having closed opposite ends;
a hollow internal barrel mounted concentrically and movably within said external barrel and defining an annulus therewith;
sealing means secured around the outer wall of the internal barrel and engaging the inner wall of the external barrel to prevent fluid flow from the annulus past said sealing means;
a piston rod secured to said internal barrel and extending through a first closed end of the external barrel;
driving means outside the external barrel and secured to the piston rod for driving the rod and internal barrel in reciprocation;
a rod sleeve secured to the second closed end of the external barrel and projecting inwardly in said external barrel around said piston rod, said rod sleeve having a counterbore therein spaced along the piston rod from said second closed end of the external barrel and concentrically surrounding the piston rod, and said rod sleeve further having an orifice extending radially therethrough and communicating at its inner end with said counterbore;
a stroke dampener and stop element secured around said piston rod and dimensioned for entry into said counterbore to provide, in cooperation with said orifice, a dashpot effect upon reciprocation of said piston rod;

a plurality of fluid ports spaced axially along said external barrel and communicating with the interior thereof, said ports being spaced from each other so that, in one position of said internal barrel within said external barrel, some of said ports communicate with each other through said annulus, and the remaining ports communicate through said external barrel, and when the internal barrel is reciprocated to a second position within said external barrel, some of said ports communicate with each other through said annulus, and the remaining ports communicate through the external barrel and through the hollow interior of said internal barrel.

References Cited

UNITED STATES PATENTS

| | | | |
|---|---|---|---|
| 1,198,093 | 9/1916 | Williams | 137—625.43X |
| 2,243,344 | 5/1941 | Karst | 137—312 |
| 2,343,689 | 3/1944 | Mercier | 137—625.68 |
| 2,531,511 | 11/1950 | Hill | 137—625.68 |
| 2,953,345 | 9/1960 | Slemmons et al. | 251—171X |
| 2,970,803 | 2/1961 | Harza | 251—175 |
| 3,191,628 | 6/1965 | Kirkwood et al. | 137—312X |

M. CARY NELSON, Primary Examiner

M. O. STURM, Assistant Examiner

U.S. Cl. X.R.

251—175